United States Patent [19]
Horiuchi et al.

[11] Patent Number: 5,131,677
[45] Date of Patent: Jul. 21, 1992

[54] AIR BAG DEVICE

[75] Inventors: Noriyuki Horiuchi, Ichinomiya; Takamasa Suzuki, Konan; Norihisa Kubo; Hiroyuki Kobayashi, both of Ichinomiya, all of Japan

[73] Assignee: Toyoda Gosei Co., Ltd., Nishikasugai, Japan

[21] Appl. No.: 676,347

[22] Filed: Mar. 28, 1991

[30] Foreign Application Priority Data

Mar. 29, 1990 [JP] Japan ................................. 2-81653

[51] Int. Cl.⁵ ............................................. B60R 21/22
[52] U.S. Cl. ................................... 280/731; 280/743
[58] Field of Search ................ 280/728, 731, 732, 743

[56] References Cited
U.S. PATENT DOCUMENTS

| | | | |
|---|---|---|---|
| 4,183,550 | 1/1980 | Sudou | 280/743 |
| 4,793,631 | 12/1988 | Takada | 280/743 |
| 4,830,401 | 5/1989 | Honda | 280/743 |
| 4,877,264 | 10/1989 | Cuevas | 280/731 |
| 4,988,119 | 1/1991 | Hartmeyer | 280/743 |

FOREIGN PATENT DOCUMENTS 56-12139 3/1981 Japan .

*Primary Examiner*—Kenneth R. Rice
*Attorney, Agent, or Firm*—Cushman, Darby & Cushman

[57] ABSTRACT

An air bag device has a gas generator mounted on a vehicle body, and an air bag attached around the gas generator. The air bag is inflated by the gas discharged from the gas generator in an emergency of the motor vehicle. A ring-shaped retainer is arranged around the gas generator for fixing a peripheral portion of an opening of the air bag to a flange formed around the gas generator. The peripheral portion is bent along the inside end of the retainer so as to project into the air bag, thereby forming a saddle-shaped projecting portion which is in contact with the inside end of the retainer. When the air bag is inflated by the gas discharged from the gas generator, and the peripheral portion of the opening of the air bag is pulled outwardly with respect to the gas generator due to a tension applied to the air bag, the saddle-shaped projecting portion abuts the inside end of the retainer, thereby resisting the above tension.

10 Claims, 3 Drawing Sheets

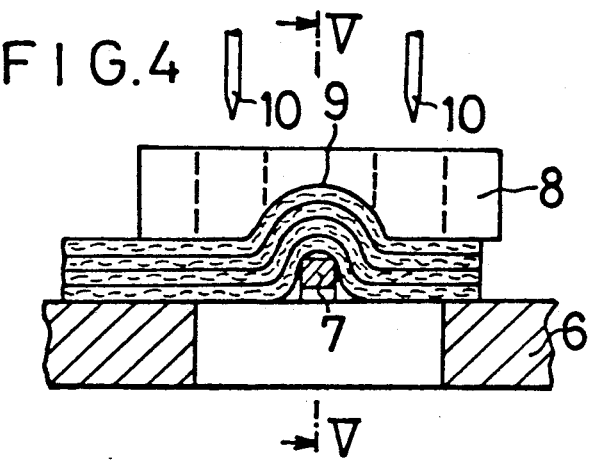
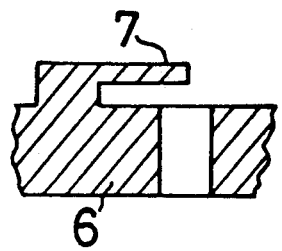
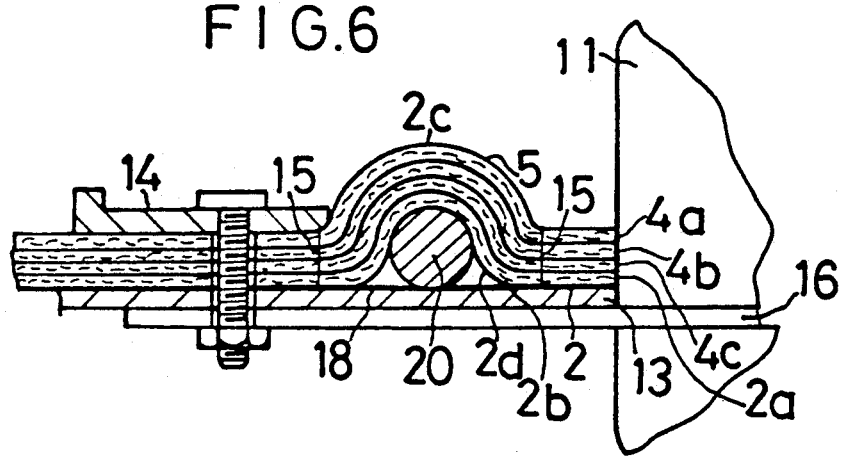
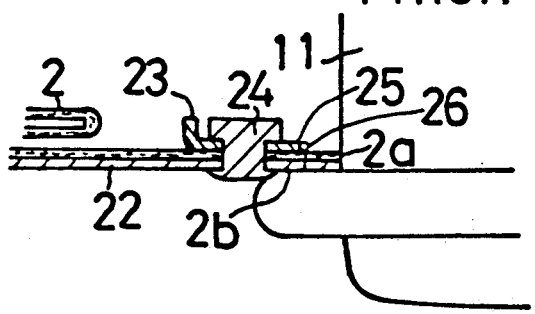

AIR BAG DEVICE

BACKGROUND OF THE INVENTION

1. Field of the Invention

The present invention relates to an air bag device for a motor vehicle, and more particularly to an air bag device wherein a peripheral portion of an opening of a hollow air bag, which is to be attached around a gas generator, is reinforced.

2. Description of the Prior Art

Air bag devices have been mounted on motor vehicles for protecting passengers or occupants in the events of an accident.

The air bag device is generally provided with a gas generator mounted on the steering wheel, dash board or the like to discharge gas in the event of an accident, and a hollow air bag having a peripheral portion, defining an opening, which is attached around the gas generator. The air bag is normally housed in a folded condition. In an emergency, gas is discharged from the gas generator to rapidly inflate the air bag.

When the air bag is inflated and a tension is applied to the air bag, the peripheral portion of the opening of the air bag is pulled outwardly with respect to the gas generator. In order to resist this tension and to prevent the peripheral portion of the opening of the air bag from moving outwardly with respect to the gas generator, the conventional air bag devices have adopted various measures.

In one of the conventional air bag devices, one or more reinforcing sheets are sewed to the peripheral portion of the opening of the air bag, and the thus reinforced peripheral portion is fixed to the gas generator by sandwiching it between a retainer and a flange formed around the gas generator.

However, in the above conventional device, the air bag must be firmly clamped by the retainer and the flange in order to resist the above-described tension. Accordingly, the retainer and the flange must each have both a high stiffness and a large thickness.

Another conventional air bag device provided with means for resisting the tension, is disclosed in U.S. Pat. No. 4,793,631.

In this conventional device, as shown in FIG. 7, a peripheral portion 2b of an opening 2a of a hollow air bag 2, which surrounds a gas generator 11, is firmly sandwiched between a back holder 22 fixed to the gas generator 11, and an annular retainer 23 by means of rivets 24.

Stitches 26 are formed in the peripheral portion 2b of the air bag 2 along an end 25 of the annular retainer 23 so as to project into the air bag 2. In an accident, the projecting stitches 26 are brought into contact with the end 25 of the annular retainer 23, thereby intending to resist the tension which is applied to the peripheral portion 2b of the inflated air bag 2. However, these projecting stitches 26 do not have a height and a stiffness sufficient to resist the above described tension, and accordingly cannot sufficiently attain their object.

SUMMARY OF THE INVENTION

It is an object of the present invention to provide an air bag device for a motor vehicle which can resist a tension applied to a peripheral portion of an opening of an air bag due to the inflation of the air bag in an emergency of the motor vehicle such as an accident.

The air bag device in accordance with the present invention has a gas generator mounted on a vehicle body for discharging gas in the event of an accident, and an air bag which is attached around the gas generator in its peripheral portion of an opening thereof. The air bag is normally housed in the folded condition, and is inflated by the gas discharged from the gas generator in the event of an accident. A ring-shaped retainer is arranged around the gas generator for fixing the peripheral portion of the air bag to a flange formed around the gas generator. The peripheral portion of the air bag is bent along the inside end of the retainer so as to project into the air bag, thereby forming a projecting portion which is in contact with the inside end of the retainer.

In operation, when an air bag is inflated by the gas discharged from the gas generator, and the peripheral portion of the opening of the air bag is pulled outwardly with respect to the gas generator due to a tension applied to the air bag, the projecting portion formed in the peripheral portion abuts the inside end of the retainer, thereby resisting the above-described tension.

BRIEF DESCRIPTION OF THE DRAWING

Other objects, features and characteristics of the present invention will become apparent upon consideration of the following description and the appended claims with reference to the accompanying drawings, all of which form a part of this specification.

FIG. 4 is a diagram showing the method for forming the projecting portion of FIG. 3;

FIG. 5 is a cross-sectional view taken along the line V—V of FIG. 4;

FIG. 6 is a cross-sectional view of one portion of a second embodiment of the air bag device in accordance with the present invention, which corresponds to portion A of FIG. 1; and FIG. 7 is a cross-sectional view of one portion of the conventional air bag device, which corresponds to portion A of FIG. 1.

DETAILED DESCRIPTION OF THE PRESENTLY PREFERRED EXEMPLARY EMBODIMENTS

Figure 1:
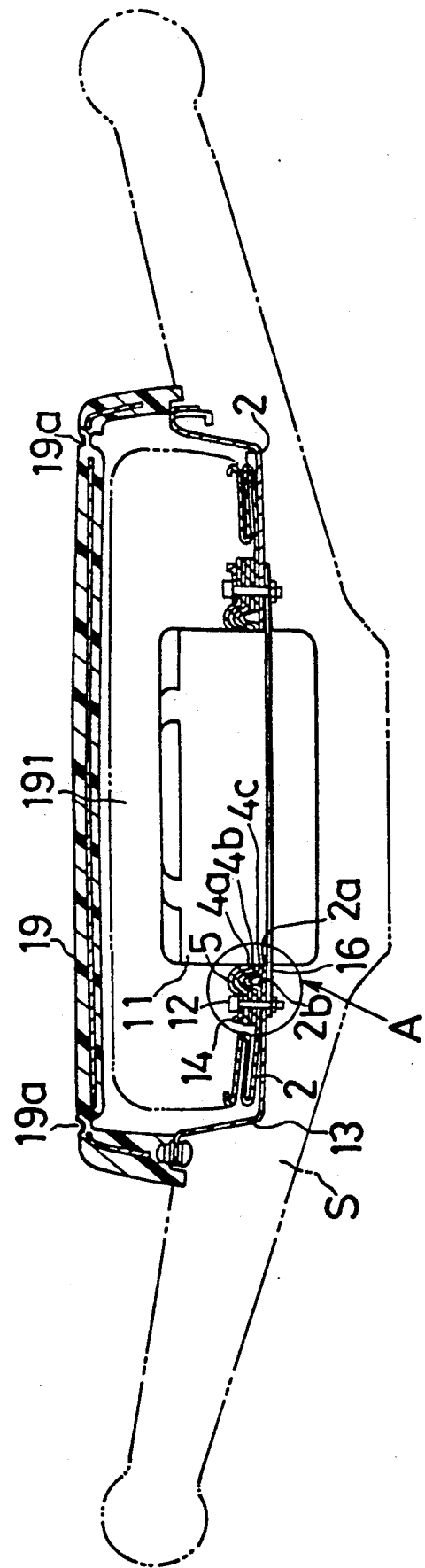
FIG. 1 is an overall cross-sectional view of a first embodiment of an air bag device in accordance with the present invention.
Figure 2:
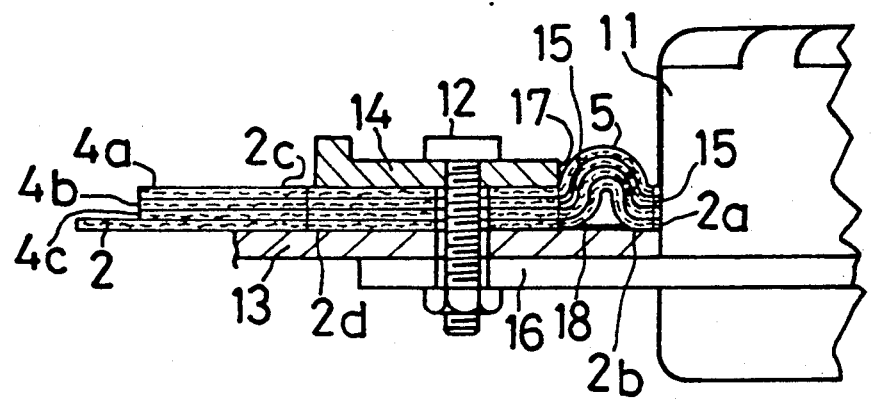
FIG. 2 is an enlarged cross-sectional view of portion A of FIG. 1.

FIGS. 1 to 5 illustrate a first embodiment of an air bag device in accordance with the present invention. In FIG. 1, the air bag device is mounted on a steering wheel S provided in front of a driver's seat of a motor vehicle. In FIGS. 1 and 2, a peripheral portion 2b of an opening 2a of a hollow air bag 2 is attached around a gas generator 11. Reinforcing sheets 4a, 4b and 4c are sewed to the peripheral portion 2b of the air bag 2.

A ring-shaped bag holder 13, and a ring-shaped retainer 14, each having an inner diameter larger than that of the gas generator 11, are arranged on a flange 16 provided around the gas generator 11, so as to be substantially coaxial with the gas generator 11. The peripheral portion 2b of the air bag 2 is sandwiched between the bag holder 13 and the retainer 14, and is fixed to the flange 16 at several points along the gas generator 11 by means of bolts 12.

As shown in FIG. 1, an outer periphery of the bag holder 13 is bent upwardly, and is engaged with an outer periphery of a vessel-shaped cover member 19 made of resin, thereby defining a space 191 for housing the air bag 2 in the folded condition. The cover member 19 has thin-walled portions 19a which break due to the pressure of the inflated air bag 2.

A projecting portion 5 having a saddle-shaped cross-section is formed in the peripheral portion 2b of the opening 2a of the air bag 2. The projecting portion 5 projects into the air bag 2 in contact with an inside end 17 of the retainer 14, as shown in FIG. 2.

One example of the method for forming the projecting portion 5 will be explained.

The reinforcing sheets 4a, 4b and 4c are laminated on and sewed to the peripheral portion 2b of the air bag 2. Each of the reinforcing sheets 4a, 4b, 4c and the air bag 2 is composed of a plain fabric made of 66 nylon, which is coated with chloroprene rubber or silicon rubber. Then, as shown in FIGS. 4 and 5, the projecting portion 5 is formed in the laminated body of the air bag 2 and the reinforcing sheets 4a, 4b and 4c by using a twin needle lock stitch sewing machine which has two needle threads 15 and a bobbin thread 18 in the following manner. The above laminated body is passed between a bed 6 having an arm 7, and a pressor foot 8 having a concave portion 9, and is sewed with sewing threads 15, 18 of 66 nylon by means of two needles 10, thereby forming the projecting portion 5.

Figure 3:
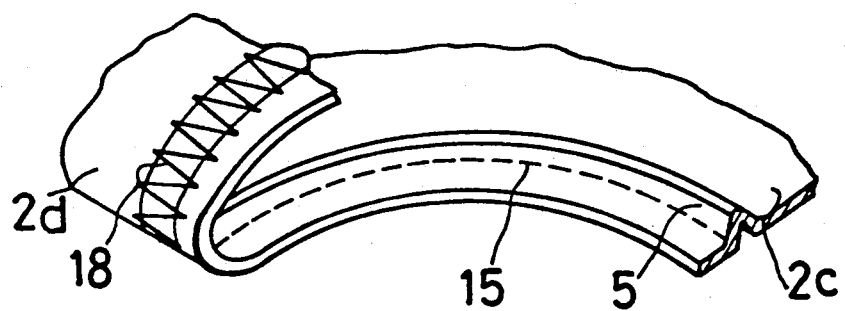
FIG. 3 is a perspective view diagramatically illustrating a projecting portion provided in the first embodiment of the air bag device.

The peripheral portion 2b of the air bag 2, in which the projecting portion 5 is formed by the above-described method, has a configuration illustrated in FIG. 3. As is apparent from the drawing, zigzag stitches 18 are formed on the outer surface 2d of the air bag 2, and two rows of stitches 15, 15 are formed on the inner surface 2c of the air bag 2.

In accordance with the air bag device of the first embodiment having the above-described structure, in an emergency, gas is discharged from the gas generator 11 to inflate the air bag 2. At this time, the cover member 19 is pressed by the inflated air bag 2 and breaks at the thin-walled portions 19a. The inflated air bag 2 protects the driver of passenger.

When a tension is applied to the air bag 2 upon inflation, the projecting portion 5 is brought into contact with the inside end 17 of the ring-shaped retainer 14, thereby resisting the above tension.

This projecting portion 5 can have a height sufficient to contact the inside end 17 of the retainer 14 and a stiffness sufficient to the above tension because it is formed by bending the gas bag 2 itself. Accordingly, the peripheral portion 2b is sufficiently reinforced against the above tension by virtue of the projecting portion 5.

In the first embodiment, the reinforcing sheets 4a, 4b and 4c are sewed to the air bag 2. This air bag 2 need not necessarily be reinforced by these reinforcing sheets 4a, 4b and 4c.

FIG. 6 illustrates a second embodiment of an air bag device in accordance with the present invention. In the second embodiment, a ring member 20 is disposed under the peripheral portion 2b of the air bag 2 along the saddle-shaped projecting portion 5. The remainder of the structure of the air bag device of the second embodiment is identical to that of the first embodiment.

One example of the method of assembling the ring member 20 into the air bag device will be explained.

The reinforcing sheets 4a, 4b and 4c are laminated on and sewed to the air bag 2 similar to the first embodiment. The resulting laminated body is then sewn to a ring-shaped core of circular cross-section, serving as the ring member 20, which is disposed under the peipheral portion 2b of the laminated body. For example a lock switch sewing machine having the same construction as that used in the first embodiment, can be used to sew the laminated body to the ring member 20 thereby forming the projecting portion 5 of a saddle-shaped cross-section, along which the ring-shaped core 20 is disposed.

In accordance with the second embodiment, by virtue of the ring member 20, the shape retention of the projecting portion 5 is improved, and the resulting air bag 2 positively resists the tension applied to the peripheral portion of the air bag upon inflation.

What is claimed is:

1. An air bag device for a motor vehicle, comprising:
    a gas generator adapted to be mounted on a part of a body of the motor vehicle for discharging gas;
    a flange formed around said gas generator;
    a hollow air bag having an opening, a peripheral portion of which is coupled to said flange, said air bag being normally housed in a folded condition, and being inflated when gas is discharged from said gas generator; and
    a ring-shaped retainer arranged around said gas generator for fixing said peripheral portion of said opening of said gas bag to said flange,
    said peripheral portion of said air bag being bent along an inside edge of said ring-shaped retainer so as to project vertically upwardly into said air bag, thereby forming a projecting portion which is in contact with said inside edge of said retainer.

2. The air bag device according to claim 1, wherein said projecting portion formed in said peripheral portion of said opening of said air bag has a saddle-shaped cross-section.

3. The air bag device according to claim 2, wherein a ring member is disposed under said peripheral portion of said gas bag and along said projecting portion having a saddle-shaped cross-section.

4. The air bag device according to claim 1, wherein at least one reinforcing sheet is laminated on and sewn to said peripheral portion of said air bag.

5. The air bag device according to claim 1, wherein the shape of said projecting portion is retained by a zigzag stitching formed on an outer surface of said air bag.

6. The air bag device according to claim 1, wherein said air bag is made of a coated fabric.

7. The air bag device according to claim 6, wherein said coated fabric is composed of 66 nylon fabric coated with one of chloroprene rubber and silicon rubber.

8. The air bag device according to claim 4, wherein said at least one reinforcing sheet is made of a coated fabric.

9. The air bag device according to claim 8, wherein said coated fabric is composed of 66 nylon fabric coated with one of chloroprene rubber and silicon rubber.

10. The air bag device according to claim 5, wherein said zigzag thread is formed with a sewing stitching of 66 nylon.

* * * * *